United States Patent
Jung

(10) Patent No.: US 11,307,743 B2
(45) Date of Patent: Apr. 19, 2022

(54) METHOD, ELECTRONIC DEVICE AND STORAGE MEDIUM FOR PROVIDING MODE SWITCHING

(71) Applicant: Samsung Electronics Co., Ltd., Gyeonggi-do (KR)

(72) Inventor: Gi-Hyen Jung, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/758,943

(22) PCT Filed: Jul. 6, 2018

(86) PCT No.: PCT/KR2018/007720
§ 371 (c)(1),
(2) Date: Apr. 24, 2020

(87) PCT Pub. No.: WO2019/093616
PCT Pub. Date: May 16, 2019

(65) Prior Publication Data
US 2021/0181926 A1    Jun. 17, 2021

(30) Foreign Application Priority Data
Nov. 7, 2017 (KR) .................. 10-2017-0147662

(51) Int. Cl.
*G06F 3/0484* (2013.01)
*G06F 11/34* (2006.01)
*G06F 3/04842* (2022.01)

(52) U.S. Cl.
CPC ...... *G06F 3/04842* (2013.01); *G06F 11/3438* (2013.01)

(58) Field of Classification Search
CPC ............. G06F 3/04842; G06F 11/3438; G06F 1/3234; G06F 3/016; G06F 1/3203;
(Continued)

(56) References Cited

U.S. PATENT DOCUMENTS

| 8,958,854 B1* | 2/2015 | Morley | G06F 1/3212 |
| | | | 455/574 |
| 2004/0036680 A1* | 2/2004 | Davis | G06F 3/0488 |
| | | | 345/169 |

(Continued)

FOREIGN PATENT DOCUMENTS

| KR | 10-2014-0095393 A | 8/2014 |
| KR | 10-2015-0033505 A | 4/2015 |

(Continued)

*Primary Examiner* — John T Repsher, III
(74) *Attorney, Agent, or Firm* — Cha & Reiter, LLC.

(57) ABSTRACT

According to various embodiments, an electronic device comprises: a housing; a display mounted or coupled to the housing; a processor located within the housing and electrically connected to the display; and a memory located within the housing and electrically connected to the processor, wherein the memory may store instructions that, when executed, cause the processor to: in a first mode, provide a first user graphical interface comprising a plurality of graphical elements corresponding to a plurality of applications; if a first condition is satisfied, provide a second user graphical interface comprising graphical elements from among the plurality of graphical elements that are allowed to be used in a second mode; and if a second condition is satisfied, add at least one graphical element from among the plurality of graphical elements to the second user graphical interface. Other embodiments are possible.

4 Claims, 12 Drawing Sheets

(58) Field of Classification Search
CPC ........ G06F 1/32; G06F 1/3215; G06F 3/0481;
G06F 3/0488; G06F 3/0484; Y02D 10/00
See application file for complete search history.

(56) References Cited

U.S. PATENT DOCUMENTS

| | | |
|---|---|---|
| 2012/0272230 A1 | 10/2012 | Lee |
| 2013/0215044 A1* | 8/2013 | Ahn .................... G06F 3/04883 |
| | | 345/173 |
| 2016/0209907 A1 | 7/2016 | Han et al. |
| 2016/0357394 A1* | 12/2016 | Tae ....................... G06F 3/0488 |
| 2017/0300108 A1* | 10/2017 | Yang .................... G06F 1/3206 |
| 2017/0344092 A1* | 11/2017 | Bluestein ................ G06F 1/329 |

FOREIGN PATENT DOCUMENTS

| | | |
|---|---|---|
| KR | 10-1535365 B1 | 7/2015 |
| KR | 10-2016-0143429 A | 12/2016 |
| KR | 10-2017-0094701 A | 8/2017 |
| KR | 10-2018-0109614 A | 10/2018 |

\* cited by examiner

METHOD, ELECTRONIC DEVICE AND STORAGE MEDIUM FOR PROVIDING MODE SWITCHING

CROSS-REFERENCE TO RELATED APPLICATION(S)

This application is a National Phase Entry of PCT international Application No. PCT/KR2018/007720, which was filed on Jul. 6, 2018, and claims priority to Korean Patent Application No. 10-2017-0147662 filed on Nov. 7, 2017, in the Korean Intellectual Property Office, the contents of which are incorporated herein by reference.

BACKGROUND

1. Field

Various embodiments relate to a mode switching method and an electronic device therefor.

2. Description of the Related Art

Recently, technologies for electronic devices and methods for controlling electronic devices have been rapidly developed. Particularly, electronic devices may be formed as portable terminals. Therefore, users carrying an electronic device can use services provided by the electronic device while moving to different locations.

Electronic devices may include a battery for portability. However, the capacity of a battery is limited. Thus, electronic devices require a technique for reducing battery consumption.

SUMMARY

When an electronic device provides a power saving mode, it may not be easy in the power saving mode for a user to use a desired application other than preset applications.

In the power saving mode, the preset applications are provided regardless of the situation of the electronic device, which may cause inconvenience in use.

According to various embodiments, an electronic device may include: a housing; a display configured to be mounted in or coupled to the housing; a processor configured to be disposed in the housing and to be electrically connected to the display; and a memory configured to be disposed in the housing and to be electrically connected to the processor, wherein the memory may store instructions which, when executed, cause the processor to: provide a first graphical user interface including a plurality of graphical elements corresponding to a plurality of applications in a first mode; provide a second graphical user interface including graphical elements allowed to be used in a second mode among the plurality of graphical elements when a first condition is satisfied; and add at least one graphical element among the plurality of graphical elements to the second graphical user interface when a second condition is satisfied.

According to various embodiments, an operating method of an electronic device may include: providing a first graphical user interface including a plurality of graphical elements corresponding to a plurality of applications in a first mode; providing a second graphical user interface including graphical elements allowed to be used in a second mode among the plurality of graphical elements when a first condition is satisfied; and adding at least one graphical element among the plurality of graphical elements to the second graphical user interface when a second condition is satisfied.

According to various embodiments, an application to be used in a power saving mode may be provided based on usage history information about an electronic device and may thus be convenient to use.

According to various embodiments, an application to be used in a power saving mode may be provided automatically or through simple input by a user and may thus be convenient to use.

DETAILED DESCRIPTION

Figure 1:
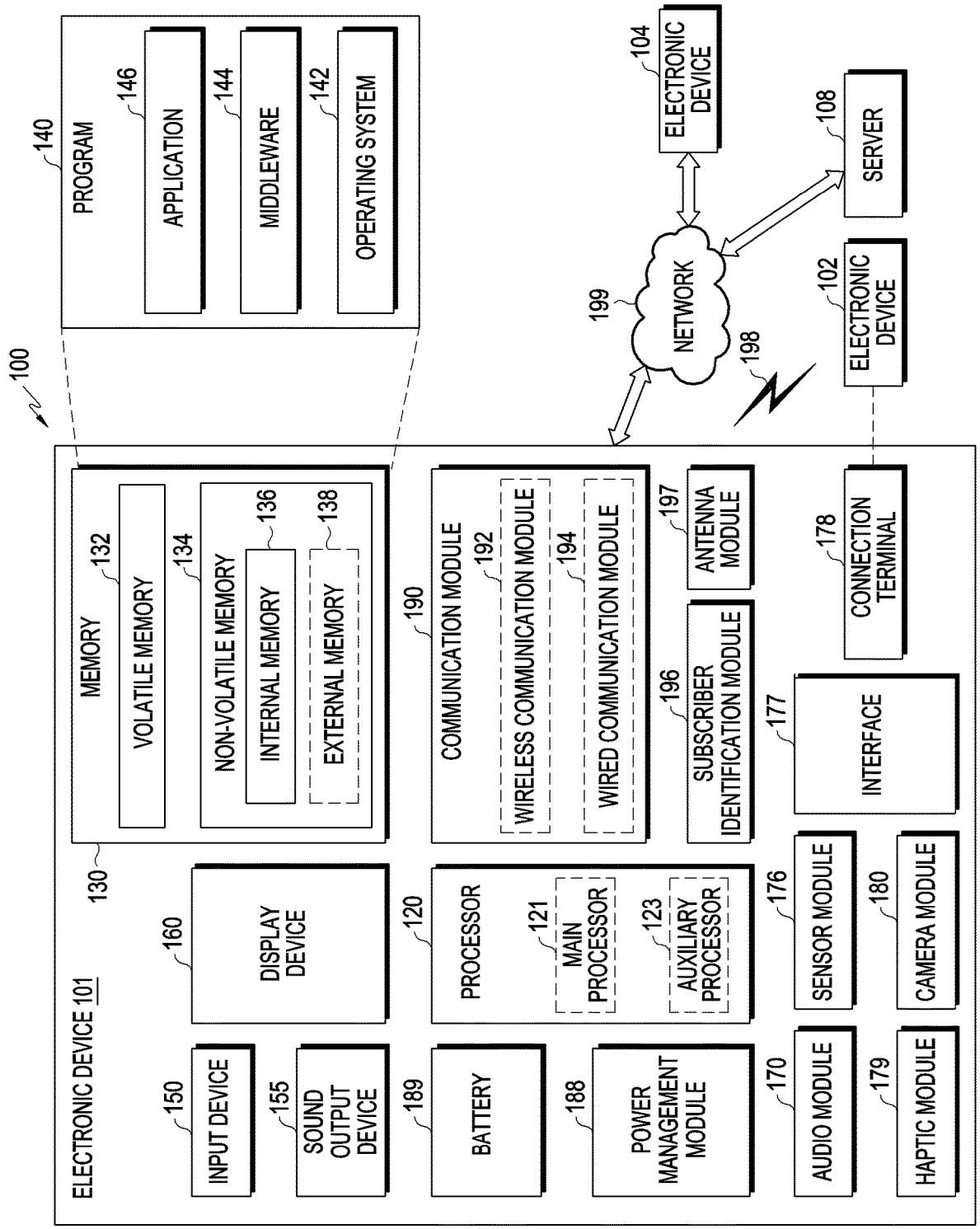
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 through a first network (e.g., short range wireless communication) or may communicate with an electronic device 104 or a server 108 through a second network 199 (e.g., long distance wireless communication). According to one embodiment, the electronic device 101 may communicate with the electronic device 104 through the server 108. According to one embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. According to some embodiments, at least one (e.g., the display device 160 or the camera module 180) of the above-described components of the electronic device 101 may be omitted or other components may be added to the electronic device 101. In some embodiments, some of the components may be integrated and implemented, such as the sensor module 176 (e.g., a fingerprint sensor, an iris sensor, or an illuminance sensor) which is embedded in the display device 160.

The processor 120 may control at least one other component (e.g., hardware or software component) of the electronic device 101 connected to the processor 120 by driving, for example, software (e.g., the program 140), and may perform various data processing and operations. The processor 120 may load or process commands or data received from the other components (e.g., the sensor module 176 or the communication module 190) into a volatile memory 132, and may store the resulting data in a non-volatile memory 134. According to one embodiment, the processor 120 may include a main processor 121 (e.g., central processing unit or application processor) and an auxiliary processor 123 (e.g., a graphics processing device, an image signal processor, a sensor hub processor, or a communications processor) that is operated independently of the main processor 121 and additionally or alternatively uses lower power than the main processor 121 or is specialized for a designated function. Here, the auxiliary processor 123 may be embedded and operated separately from the main processor 121.

In this case, the auxiliary processor 123 may control at least some of functions or states associated with at least one (e.g., the display device 160, the sensor module 176, or the communication module 190) of the electronic device 101, on behalf of the main processor 121 while the main processor 121 is, for example, in an inactive state (e.g., sleep) or together with the main processor 121 while the main processor 121 is in an active state (e.g., application performing). According to one embodiment, the auxiliary processor 123 (e.g., an image signal processor or a communication processor) may be implemented as some components of other components (e.g., the camera module 180 or the communication module 190) that are functionally related thereto. The memory 130 may store various data, which is used by the at least one component (e.g., the processor 120 or the sensor module 176) of the electronic device 101, for example, input data or output data for software (e.g., the program 140) and the related commands. The memory 130 may include the volatile memory 132 or the non-volatile memory 134.

The program 140 may be software stored in the memory 130 and may include, for example, an operating system 142, a middleware 144, or an application 146.

The input device 150 may be a device for receiving commands or data to be used for the component (e.g., the processor 120) of the electronic device 101 from the outside (e.g., a user) of the electronic device 101, and may include, for example, a microphone, a mouse, or a keyboard.

The sound output device 155 may be a device for outputting a sound signal to the outside of the electronic device 101, and may include, for example, a speaker for general use such as multimedia reproduction or recording reproduction and a receiver used exclusively for receiving calls. According to one embodiment, the receiver may be formed integrally with or separately from the speaker.

The display device 160 may be a device for visually providing information to a user of the electronic device 101 and may include, for example, a display, a hologram device, a projector, or a control circuitry for controlling a device. According to one embodiment, the display device 160 may include touch circuitry or a pressure sensor capable of measuring the intensity of the pressure on a touch.

The audio module 170 may bidirectionally convert sound and electrical signals. According to one embodiment, the audio module 170 may acquire sound through the input device 150, or may output sound through an external electronic device (e.g., the electronic device 102 (e.g., a speaker or a headphone)) that is wiredly or wirelessly connected to the sound output device 155 or the electronic device 101.

The sensor module 176 may generate an electrical signal or a data value corresponding to an internal operating state (e.g., power or temperature) of the electronic device 101 or an external environmental condition thereof. The sensor module 176 may include, for example, a gesture sensor, a gyro sensor, a barometric sensor, a magnetic sensor, an acceleration sensor, a grip sensor, a proximity sensor, a color sensor, an infrared (IR) sensor, a biosensor, a temperature sensor, a humidity sensor, or an illuminance sensor.

The interface 177 may support a designated protocol that can be wiredly or wirelessly connected to an external electronic device (e.g., the electronic device 102). According to one embodiment, the interface 177 may include a high definition multimedia interface (HDMI), a universal serial bus (USB) interface, an SD card interface, or an audio interface.

A connection terminal 178 may include a connector capable of physically connecting the electronic device 101 and an external electronic device (e.g., the electronic device 102), for example, an HDMI connector, a USB connector, an SD card connector, or an audio connector (e.g., a headphone connector).

The haptic module 179 may convert an electrical signal into a mechanical stimulus (e.g., vibration or movement) or an electrical stimulus that can be perceived by a user through tactile or kinesthetic sensations. The haptic module 179 may include, for example, a motor, a piezoelectric element, or an electrical stimulation device.

The camera module 180 may capture a still image and a moving image. According to one embodiment, the camera module 180 may include one or more lenses, an image sensor, an image signal processor, or a flash.

The power management module 188 may be a module for managing power supplied to the electronic device 101, and may be configured as at least a portion of, for example, a power management integrated circuit (PMIC).

The battery 189 may be a device for supplying power to at least one component of the electronic device 101 and may include, for example, a non-rechargeable primary battery, a rechargeable secondary battery, or a fuel cell.

The communication module 190 may support establishment of a wired or wireless communication channel between the electronic device 101 and an external electronic device (e.g., the electronic device 102, the electronic device 104, or the server 108) and communication performance through the established communication channel. The communication module 190 may include one or more communication processors that support wired communication or wireless communication, which is operated independently of the processor 120 (e.g., an application processor). According to one embodiment, the communication module 190 may include a wireless communication module 192 (e.g., a cellular communication module, a short range wireless communication module, or a global navigation satellite system (GNSS) communication module) or a wired communication module 194 (e.g., a local area network (LAN) communication module or a power line communication module). Using the corresponding communication module among them, the communication module 190 may communicate with an external electronic device through the first network (e.g., a short range communication network such as Bluetooth, Wi-Fi direct, or infrared data association (IrDA)) or the second network 199 (e.g., a long distance communication network such as a cellular network, the Internet, or a computer network (e.g., LAN or WAN)). The various types of communication modules 190 described above may be implemented as a single chip or separate chips.

According to one embodiment, the wireless communication module 192 may use user information stored in the subscriber identification module 196 to identify and authenticate the electronic device 101 within the communication network.

The antenna module 197 may include one or more antennas for transmitting or receiving signals or power to or from the outside. According to one embodiment, the communication module 190 (e.g., the wireless communication module 192) may transmit or receive signals to or from an external electronic device via an antenna suitable for the corresponding communication method.

Some of the above-described components may be coupled to each other through a communication method (e.g., bus, general purpose input/output (GPIO), serial peripheral interface (SPI), or mobile industry processor interface (MIPI)) between peripheral devices to exchange signals (e.g., commands or data) therebetween.

According to one embodiment, the commands and data may be transmitted or received between the electronic device 101 and the external electronic device 104 via the server 108 connected to the second network 199. Each of the electronic devices 102 and 104 may be the same or a different kind of device as or from the electronic device 101. According to one embodiment, all or some of the operations executed in the electronic device 101 may be executed in another electronic device or a plurality of external electronic devices. According to one embodiment, when the electronic device 101 is required to perform any function or service automatically or by a request, the electronic device 101 may request at least partial function associated with the function or the service from an external electronic device additionally or in place of executing the function or the service by itself. The external electronic device receiving the request may execute the requested function or additional function, and may transmit the execution result to the electronic device 101. The electronic device 101 may process the received result as is or additionally, and may provide the requested function or service. For this, for example, a cloud computing technology, a distributed computing technology, or a client-server computing technology may be used.

Figure 2:
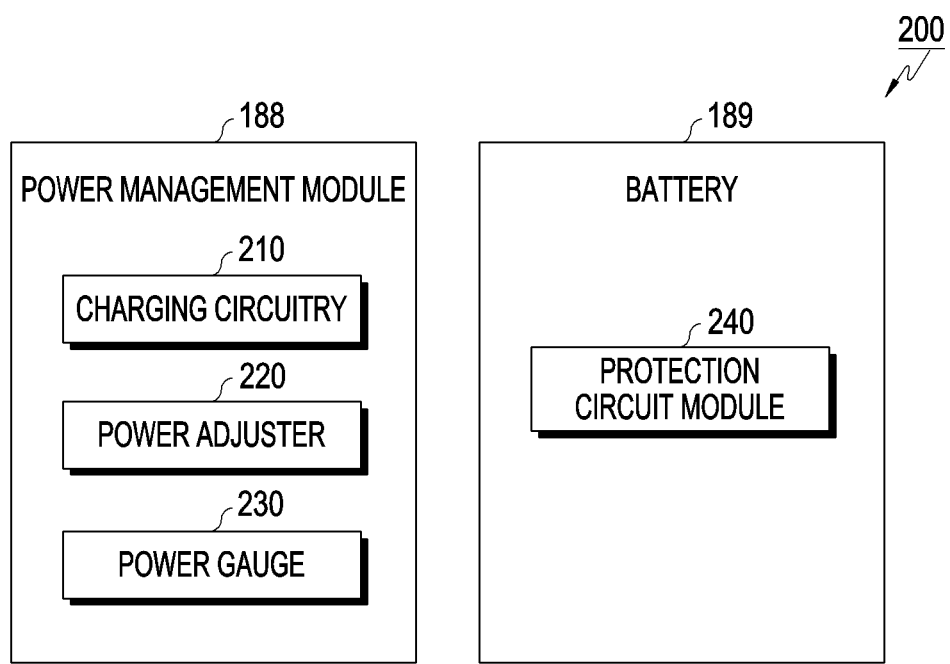
FIG. 2 is a block diagram illustrating a power management module and a battery according to various embodiments.

FIG. 2 is a block diagram 200 illustrating the power management module 188 and the battery 189 according to various embodiments. Referring to FIG. 2, the power management module 188 may include a charging circuit 210, a power regulator 220, or a fuel gauge 230. The charging circuit 210 may charge the battery 189 using power supplied from an external power source to the electronic device 101. According to one embodiment, the charging circuit 210 may select a charging method (e.g., normal charging or rapid charging) based on at least some of the type of the external power source (e.g., a power adapter, a USB, or a wireless charger), the magnitude (e.g., about 20 watts or more) of power that can be supplied from the external power source, and the attribute of the battery 189, and may charge the battery 189 using the selected charging method. The external power source may be wiredly connected through the connection terminal 178 or may be wirelessly connected through the antenna module 197.

The power regulator 220 may generate a plurality of powers having different voltages or different current levels by adjusting the voltage level or the current level of the power supplied from the external power source or the battery 189. The power regulator 220 may adjust the power of the external power source or the battery 189 to a voltage or current level suitable for each of the components included in the electronic device 101. According to one embodiment, the power regulator 220 may be implemented in the form of a low dropout (LDO) regulator or a switching regulator.

The fuel gauge 230 may measure usage state information (e.g., capacity of the battery, number of charge/discharge cycles, voltage, or temperature) of the battery 189.

The power management module 188 may determine charging state information (e.g., lifetime, over voltage, low voltage, over current, over charging, over discharging, overheating, short-circuit, or swelling) associated with the charging of the battery 189 based on at least a portion of the measured usage state information, using, for example, the charging circuit 210, the voltage regulator 220, or the fuel gauge 230, may ascertain whether the battery 189 is in an abnormal state or a normal state based at least a portion of the determined charging state information, and then may adjust (e.g., reducing a charging current or voltage or stopping charging) the charging of the battery 189 when the battery 189 is ascertained to be in the abnormal state. According to one embodiment, at least some of the functions of the power management module 188 may be performed by an external control device (e.g., the processor 120).

According to one embodiment, the battery 189 may include a protection circuit module (PCM) 240 for a battery. The PCM 240 may perform various functions (e.g., a pre-shutdown function) to prevent degradation or burn-out of the battery 189. The PCM 240 may be additionally or alternatively configured as at least a portion of a battery management system (BMS) for performing cell balancing, battery capacity measurement, charging/discharging count measurement, temperature measurement, or voltage measurement.

According to one embodiment, at least a portion of the usage state information or the charging state information of the battery 189 may be measured using the corresponding sensor (e.g., temperature sensor) among the fuel gauge 230, the power management module 188, and the sensor module 176. In this case, according to one embodiment, the corresponding sensor (e.g., temperature sensor) of the sensor module 176 may be included as a portion of the PCM 240, or may be disposed in the vicinity of the battery 189 as a separate device from the PCM 240.

The electronic device according to various embodiments disclosed herein may be various types of devices. The electronic device may, for example, include at least one of a portable communication device (e.g., smartphone) a computer device, a portable multimedia device, a portable medical device, a camera, a wearable device, and a home appliance. The electronic device according to one embodiment is not limited to the above described devices.

Various embodiments and the terms used herein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. In the disclosure, the expression "A or B", "at least one of A and/or B", or "at least one of A, B, and/or C" may include all possible combinations of the items listed. The expression "a first", "a second", "the first", or "the second" may modify corresponding elements regardless of the order or importance, and is used only to distinguish one element from another element, but does not limit the corresponding elements. When an element (e.g., first element) is referred to as being "(functionally or communicatively) connected," or "directly coupled" to another element (second element), the element may be connected directly to the another element or connected to the another element through yet another element (e.g., third element).

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. For example, the module may be implemented by an application-specific integrated circuit (ASIC).

Various embodiments as described herein may be implemented by software (e.g., program 140) including an instruction stored in machine-readable storage media (e.g., internal memory 136 or external memory 138). The machine is a device that calls the stored instruction from the storage media and can operate according to the called instruction, and may include an electronic device (e.g., electronic device 101) according to the disclosed embodiments. The instruction, when executed by a processor (e.g., processor 120), may cause the processor to directly execute a function corresponding to the instruction or cause other elements to execute the function under the control of the processor. The instruction may include a code that is generated or executed by a compiler or interpreter. The machine-readable storage media may be provided in the form of non-transitory storage media. Here, the term "non-transitory" only means that the storage media is tangible without including a signal, irrespective of whether data is semi-permanently or transitorily stored in the storage media.

According to one embodiment, a method according to various embodiments disclosed herein may be provided to be included in a computer program product. The computer program product may be traded between a seller and a purchaser as a commodity. The computer program product may be distributed in the form of a machine-readable storage medium (e.g., compact disc read only memory (CD-ROM)) or distributed online through an application store (e.g., PlayStore™). In the case of online distribution, at least a portion of the computer program product may be at least temporarily stored in a storage medium such as a manufacturer's server, a server of an application store, or a memory of a relay server, or may be provisionally created.

Each component (e.g., module or program) according to various embodiments may be composed of a single entity or a plurality of entities. Some subcomponents of the above-described corresponding subcomponents may be omitted, or other subcomponents may be further included in various embodiments. Alternatively or additionally, some components (e.g., modules or programs) may be integrated into one entity to perform the function performed by each corresponding component prior to the integration in the same or similar manner. According to various embodiments, operations performed by modules, programs, or other components may be performed in a sequential, parallel, iterative, or heuristic manner. Alternatively, at least some operations may be performed in a different order or omitted, or other operations may be added.

According to various embodiments, an electronic device 101 may include: a housing; a display (e.g., the display device 160) configured to be mounted in or coupled to the housing; a processor configured to be disposed in the housing and to be electrically connected to the display; and a memory 130 configured to be disposed in the housing and to be electrically connected to the processor 120, wherein the memory 130 may store instructions which, when executed, cause the processor 120 to: provide a first graphical user interface including a plurality of graphical elements corresponding to a plurality of applications in a first mode; provide a second graphical user interface including graphical elements allowed to be used in a second mode among the plurality of graphical elements when a first condition is satisfied; and add at least one graphical element among the plurality of graphical elements to the second graphical user interface when a second condition is satisfied.

According to various embodiments, the at least one graphical element may be determined based on usage history information.

According to various embodiments, the instructions may cause the processor 120 to switch from the first mode to the second mode when the first condition is satisfied.

According to various embodiments, at least one function of the electronic device 101 is limited or blocked in the second mode.

According to various embodiments, the illumination brightness or resolution of the display may be reduced in the second mode.

According to various embodiments, the processing speed of the processor 120 may be reduced in the second mode.

According to various embodiments, a background network function or positioning function may be limited or blocked.

According to various embodiments, the instructions may cause the processor 120 to add, to the second graphical user interface, at least one graphical element corresponding to at least one application of which a ranking or a value of a number of executions, execution time, or frequency of execution is equal to or greater than a threshold value among the plurality of applications.

According to various embodiments, the instructions may cause the processor 120 to add, to the second graphical user interface, at least one graphical element corresponding to at least one application associated with a current place or time among the plurality of applications.

According to various embodiments, the instructions may cause the processor 120 to: determine whether at least one application of which a ranking or a value of a number of executions, execution time, or frequency of execution is equal to or greater than a threshold value among the plurality of applications is available in the second mode; and add the at least one graphical element corresponding to the at least one application to the second graphical user interface, based at least partly on the determination.

According to various embodiments, it may be determined whether the at least one application is available in the second mode, based on whether the at least one application of which a ranking or a value of a number of executions, execution time, or frequency of execution is equal to or greater than a threshold value among the plurality of applications is downloaded from an external electronic device, whether the at least one application functionally overlaps an application included in the second graphical user interface, whether the at least one application is an application in which limitation of some functions required for power saving is not allowed, or whether the at least one application is included in a first list.

According to various embodiments, the instructions may cause the processor 120 to: display at least some of the plurality of graphical elements on the display; and add the at least one graphical element to the second graphical user interface in response to an input on the display.

According to various embodiments, the second graphical user interface may include a first item for adding a graphical element.

According to various embodiments, the instructions may cause the processor 120 to: display the plurality of graphical elements on the display in response to an input to the first item; and display a first graphical element at the position of the first item in response to an input on the display.

According to various embodiments, the instructions may cause the processor 120 to: display at least one addible graphical element in response to a first input on the display; and add the at least one graphical element to the second graphical user interface in response to a second input on the display.

According to various embodiments, the instructions may cause the processor 120 to: display the plurality of graphical elements on the display in response to an input for a second graphical element included in the second graphical user interface; and replace the second graphical element with a third graphical element in response to an input for the third graphical element among the plurality of graphical elements.

According to various embodiments, the instructions may cause the processor to: display the second graphical element to be deletable in response to a first input for the second graphic element included in the second graphical user interface; and delete the second graphical element in response to a second input for the second graphical element.

According to various embodiments, the first input may be a long press input.

According to various embodiments, at least one application may be selected from among the plurality of applications, based at least partly on the usage history information, it may be determined whether the selected at least one application is available in the second mode, and at least one graphical element corresponding to the at least one application may be added to the second graphical user interface, based at least partly on the determination.

According to various embodiments, when the at least one graphical element is added to the second graphical user interface, the at least one graphical element corresponding to the at least one application may be displayed to be editable, and the at least one graphical element may be added to the second graphical user interface in response to an input on the display.

Figure 3:
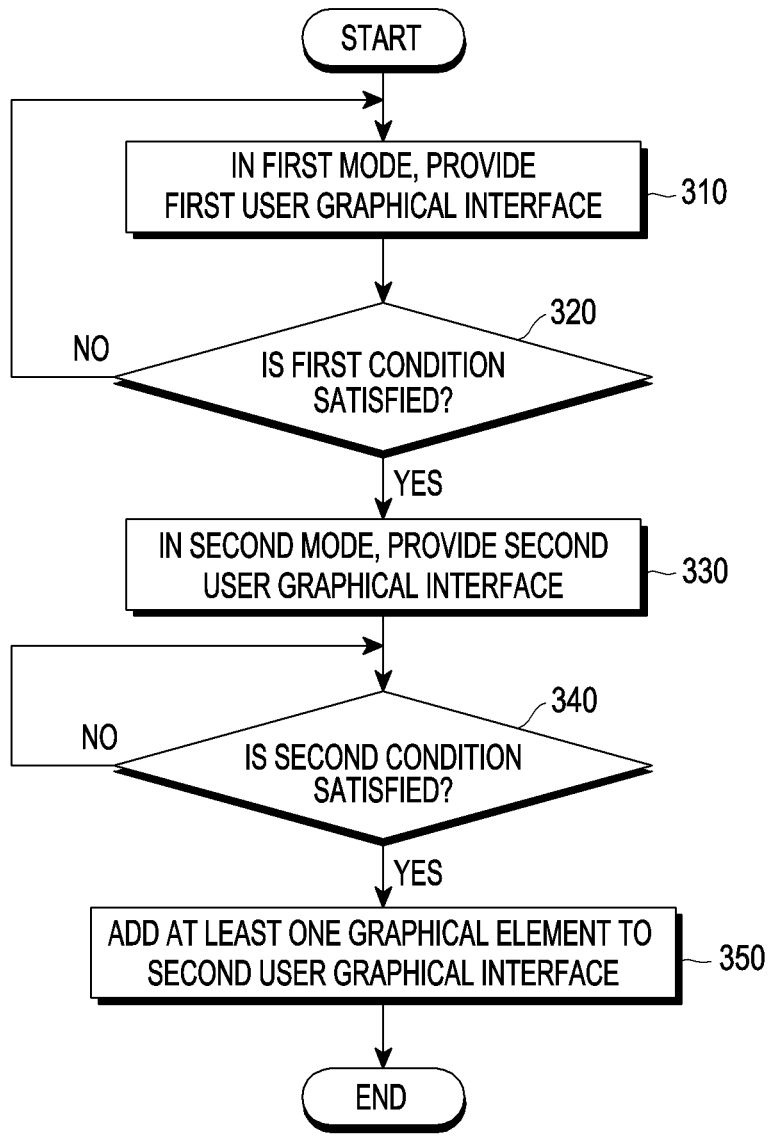
FIG. 3 is a flowchart illustrating an operating method of an electronic device according to various embodiments.

FIG. 3 is a flowchart illustrating an operating method of an electronic device according to various embodiments. The operating method may include operations 310 to 350. Each step/operation of the operating method may be performed by at least one of the electronic device (e.g., the electronic device 101), at least one processor (e.g., the processor 120) of the electronic device, or a controller (e.g., a combination of the processor 120 and a power management module (e.g., the power management module 188)) of the electronic device. In one embodiment, at least one of operations 310 to 350 may be omitted, some operations may be performed in a different order, or a different operation may be added.

In operation 310, the electronic device may operate in a first mode. In the first mode, the electronic device may provide a first graphical user interface on a display (e.g., the display device 160).

In the first mode, the electronic device may provide a plurality of functions/applications installed or executable in the electronic device. In a second mode, the electronic device may provide a plurality of functions/applications allowed to be used among the plurality of functions/applications. In the second mode, the electronic device may limit or block at least some of the plurality of functions/applications.

The first graphical user interface may include a plurality of executable graphical elements (e.g., a window, an item, a button, an icon, a menu, and a menu item) corresponding to the plurality of functions/applications.

In operation 320, the electronic device may determine whether a preset first condition is satisfied.

The electronic device may perform operation 330 when the first condition is satisfied, and may perform operation 310 when the first condition is not satisfied.

In one embodiment, the first condition may include at least one of detection of context for the electronic device, selection of a graphical element (or item) (e.g., a button, an icon, a menu, or a menu item) requiring a power saving mode, reception of a command/signal requiring power saving mode, a user input/command, entrance of the electronic device to a lock mode, or execution of a preset function/application.

In one embodiment, the context for the electronic device may include at least one of where the electronic device is positioned or arrives at a preset area/place, when it is a preset time, where the electronic device operates according to a preset operation pattern (e.g. execution of an application(s) or the like), where an attribute value indicating the current state (e.g., a remaining memory level, a signal reception strength, or the like) of the electronic device is included within a preset threshold range or is a preset threshold value or greater/less, or where the current state (e.g., a battery state, a radio signal reception state, a memory state, or the like) of the electronic device matches a preset state (e.g. is within a threshold range or is a preset threshold value or greater/less).

In one embodiment, the electronic device may detect a context associated with the electronic device. The electronic device may retrieve information associated with the context from a database stored in a memory (e.g., the memory 130) of the electronic device. When the information associated with the context is retrieved in the database, the electronic device may automatically enter the second mode.

In one embodiment, the electronic device may detect biometric information (e.g., heart rate, blood pressure, body temperature, or the like) of a user using a biometric sensor (e.g., the sensor module 176). When the detected biometric information is included within a preset threshold range or is a preset threshold value or greater/less, the electronic device may automatically enter the second mode.

In one embodiment, preset context for the electronic device may be determined based on usage history information about the electronic device.

In operation 330, the electronic device may operate in the second mode. In the second mode, the electronic device may provide a second graphical user interface on the display.

In the second mode, the electronic device may provide the second graphical user interface including graphical elements corresponding to the functions/applications allowed to be used in the second mode among the plurality of functions/applications installed or executable in the electronic device. In the second mode, the electronic device may limit or block at least some of the plurality of functions/applications.

In one embodiment, in the second mode, at least one function of the electronic device may be limited or blocked.

In one embodiment, in the second mode, the illumination brightness or resolution of the display may be reduced, the processing speed of the processor may be reduced, or a background network function or positioning function may be limited or blocked.

In one embodiment, the electronic device may execute a program (or a launcher) to execute the second mode in order to provide the second mode.

In operation 340, the electronic device may determine whether a preset second condition is satisfied.

The electronic device may perform operation 350 when the second condition is satisfied, and may perform operation 330 when the second condition is not satisfied.

In one embodiment, the second condition may include at least one of detection of preset context for the electronic device, selection of a graphical element (or item) (e.g., a button, an icon, a menu, or a menu item) requiring a change in the second graphical user interface, reception of a command/signal requiring a change in the second graphical user interface, a user input/command, or execution of a preset function/application.

In one embodiment, the preset context for the electronic device may include at least one of where the electronic device is positioned or arrives at a preset area/place, when it is a preset time, where the electronic device operates according to a preset operation pattern (e.g. execution of an application(s) or the like), where an attribute value indicating the current state (e.g., a remaining memory level, a signal reception strength, or the like) of the electronic device is included within a preset threshold range or is a preset threshold value or greater/less, or where the current state (e.g., a battery state, a radio signal reception state, a memory state, or the like) of the electronic device matches a preset state.

In one embodiment, the electronic device may detect a context associated with the electronic device. The electronic device may retrieve information associated with the context from a database stored in the memory of the electronic device. When the information associated with the context is retrieved in the database, the electronic device may automatically change the second graphical user interface.

In one embodiment, the electronic device may detect biometric information (e.g., heart rate, blood pressure, body temperature, or the like) of a user using the biometric sensor. When the detected biometric information is included within a preset threshold range or is a preset threshold value or greater/less, the electronic device may automatically change the second graphical user interface.

In one embodiment, preset context for the electronic device may be determined based on the usage history information about the electronic device.

In operation 350, the electronic device may add at least one graphical element to the second graphical user interface.

In one embodiment, the electronic device may add, to the second graphical user interface, at least one graphical element corresponding to at least one application of which a ranking or a value of a number of executions, execution time, or frequency of execution is equal to or greater than a threshold value among the plurality of applications.

In one embodiment, the electronic device may add, to the second graphical user interface, at least one graphical element corresponding to at least one application associated with a current place or time among the plurality of applications.

In one embodiment, the electronic device may detect at least one application corresponding to the context of the electronic device, based on a list/table/database stored in the memory, and may add at least one graphical element corresponding to the detected at least one application to the second graphical user interface.

In one embodiment, the list/table/database may include a list of applications recommendable in the second mode (or power saving mode), a list of applications recommendable (or frequently used or recommended by the user of the electronic device or other users) in the current situation (or current place or time), or a list of applications that consume less battery power. For example, for a terminal supporting a push-to-talk (PTT) function, an application for performing the PTT function may be recommended so that the PTT function may be used for a long time in the power saving mode.

According to various embodiments, an operating method of an electronic device may include: providing a first graphical user interface including a plurality of graphical elements corresponding to a plurality of applications in a first mode; providing a second graphical user interface including graphical elements allowed to be used in a second mode among the plurality of graphical elements when a first condition is satisfied; and adding at least one graphical element among the plurality of graphical elements to the second graphical user interface when a second condition is satisfied.

According to various embodiments, the at least one graphical element may be selected based on usage history information about the electronic device.

According to various embodiments, at least one graphical element corresponding to at least one application of which a ranking or a value of a number of executions, execution time, or frequency of execution is equal to or greater than a threshold value among the plurality of applications may be added to the second graphical user interface.

According to various embodiments, at least one graphical element corresponding to at least one application associated with a current place or time among the plurality of applications may be added to the second graphical user interface.

According to various embodiments, the adding of the at least one graphical element to the second graphical user interface may include: determining whether at least one graphical element corresponding to at least one application of which a ranking or a value of a number of executions, execution time, or frequency of execution is equal to or greater than a threshold value among the plurality of applications is available; and adding the at least one graphical element corresponding to the at least one application to the second graphical user interface, based at least partly on the determination.

According to various embodiments, the adding of the at least one graphical element to the second graphical user interface may include: displaying the plurality of graphical elements on the display in response to an input to an item for adding a graphical element; and displaying a graphical element selected from among the plurality of graphical elements at a position of the item in response to an input on the display.

Figure 4:
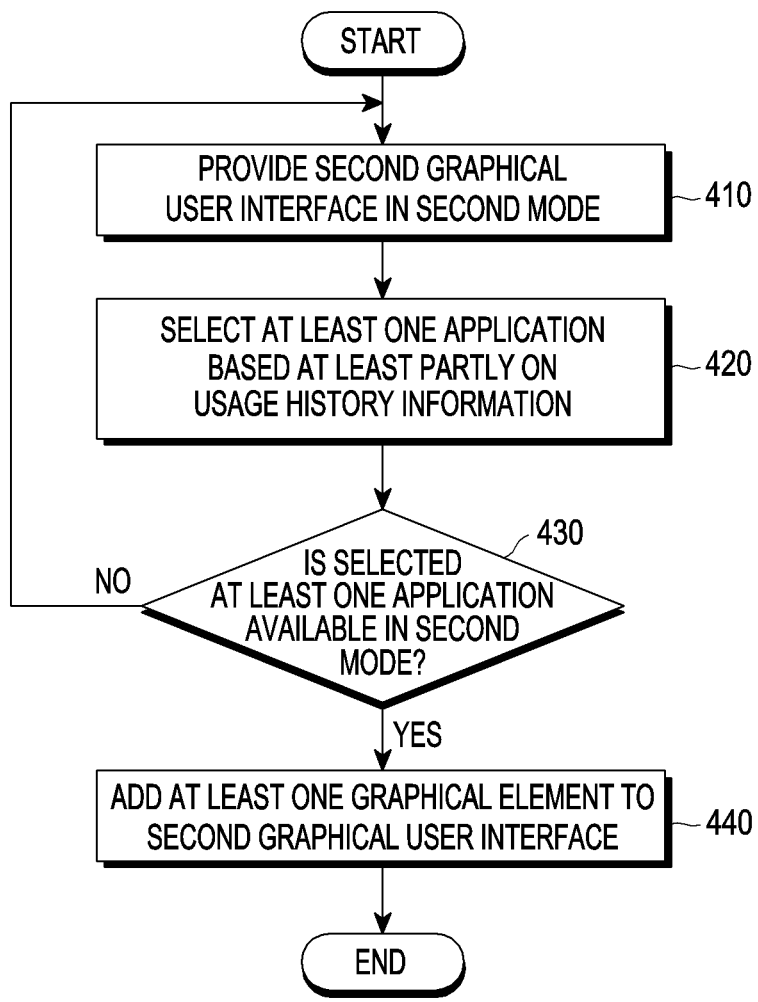
FIG. 4 is a flowchart illustrating an operating method of an electronic device according to various embodiments.

FIG. 4 is a flowchart illustrating an operating method of an electronic device according to various embodiments. The operating method may include operations 410 to 440. Each step/operation of the operating method may be performed by at least one of the electronic device (e.g., the electronic device 101), at least one processor (e.g., the processor 120) of the electronic device, or a controller (e.g., a combination of the processor 120 and a power management module (e.g., the power management module 188)) of the electronic device. In one embodiment, at least one of operations 410 to 440 may be omitted, some operations may be performed in a different order, or a different operation may be added.

In operation 410, the electronic device may operate in a second mode. In the second mode, the electronic device may provide a second graphical user interface on a display.

In the second mode, the electronic device may provide the second graphical user interface including graphical elements corresponding to functions/applications allowed to be used in the second mode among a plurality of functions/applications installed or executable in the electronic device. In the second mode, the electronic device may limit or block at least some of the plurality of functions/applications.

In operation 420, the electronic device may select at least one application from among the plurality of applications installed or executable in the electronic device, based at least partly on usage history information.

In one embodiment, the usage history information may include the number of executions, the use time, the use frequency, or the use place of the at least one application.

In operation 430, the electronic device may determine whether the selected at least one application is available in the second mode.

In one embodiment, the electronic device may determine whether the selected at least one application is available in the second mode, based at least partly on whether the selected at least one application is an application downloaded from an external electronic device, whether the selected at least one application functionally overlaps an application included in the second graphical user interface, whether the selected at least one application is an application in which limitation of some functions required for power saving is not allowed, or whether the selected at least one application is included in a first list.

The electronic device may perform operation 440 when the selected at least one application is available in the second mode, and may perform operation 420 when the selected at least one application is not available in the second mode.

In one embodiment, the electronic device may repeat operations 420 and 430 until a preset number of available applications are found.

In operation 440, the electronic device may add at least one graphical element to the second graphical user interface.

In one embodiment, the electronic device may display at least some of the plurality of graphical elements on the display and may add at least one graphical element to the second graphical user interface in response to an input on the display.

Figure 5:
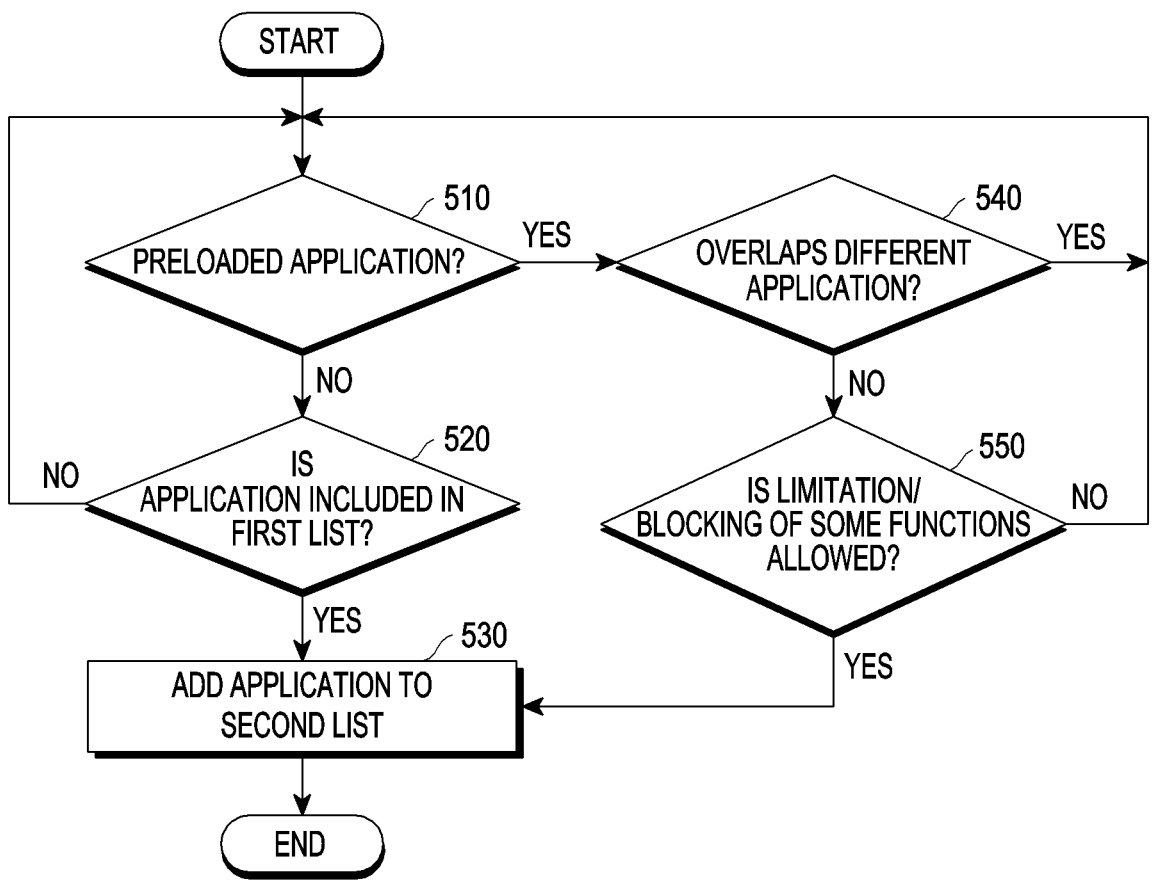
FIG. 5 is a flowchart illustrating an operating method of an electronic device according to various embodiments.

FIG. 5 is a flowchart illustrating an operating method of an electronic device according to various embodiments. The operating method may include operations 510 to 550. Each step/operation of the operating method may be performed by at least one of the electronic device (e.g., the electronic device 101), at least one processor (e.g., the processor 120) of the electronic device, or a controller (e.g., a combination of the processor 120 and a power management module (e.g., the power management module 188)) of the electronic device. In one embodiment, at least one of operations 510 to 550 may be omitted, some operations may be performed in a different order, or a different operation may be added.

In operation 510, the electronic device may determine whether a selected application among a plurality of applications installed or executable in the electronic device is a preloaded application or a third-party application downloaded from an external electronic device. For example, the preloaded application may be an application installed in the electronic device at the time of manufacture of the electronic device.

The electronic device may perform operation 540 when the selected application is a preloaded application, and may perform operation 520 when the selected application is a downloaded application.

In operation 520, the electronic device may determine whether the selected application (or an identifier thereof) is included in a first list (or table/database) stored in a memory (e.g., the memory 130).

In one embodiment, the first list may include identifiers (or identification information) of downloaded applications available in a second mode.

The electronic device may perform operation 530 when the selected application (or identifier thereof) is included in the first list, and may perform operation 510 for a different application when the selected application is not included in the first list.

In operation 530, the electronic device may add the selected application (or identifier thereof) to a second list (or table/database) stored in the memory.

The electronic device may include, in a second graphical user interface, graphical elements corresponding to applications included in the second list.

In operation 540, the electronic device may determine whether the selected application functionally overlaps a different application included in the second list.

When the selected application functionally overlaps a different application included in the second list, the electronic device performs operation 510 for a different application; when the selected application functionally overlaps a different application included in the second list, the electronic device may perform operation 550.

In one embodiment, the electronic device may determine whether the selected application functionally overlaps a different application included in the second list, based at least partly on a third list (or table/database) stored in the memory.

In one embodiment, the third list may include identifiers (or identification information) of applications having similar functions.

In one embodiment, when the selected application and the different application included in the second list are included in the third list, the electronic device may perform operation 510 for a different application.

In operation 550, the electronic device may determine whether the selected application allows limitation or blocking of some functions of the electronic device related to the second mode.

The electronic device may perform operation 530 when the selected application allows limitation or blocking of some functions, and may perform operation 510 for a different application when the selected application does not allow limitation or blocking of some functions.

In one embodiment, the electronic device may determine whether the selected application allows limitation or blocking of some functions, based on requirement information about the selected application stored in the memory. For example, when a positioning function is blocked in the second mode and the selected application requires a positioning function, the electronic device may perform operation 510 for a different application.

Figure 6:
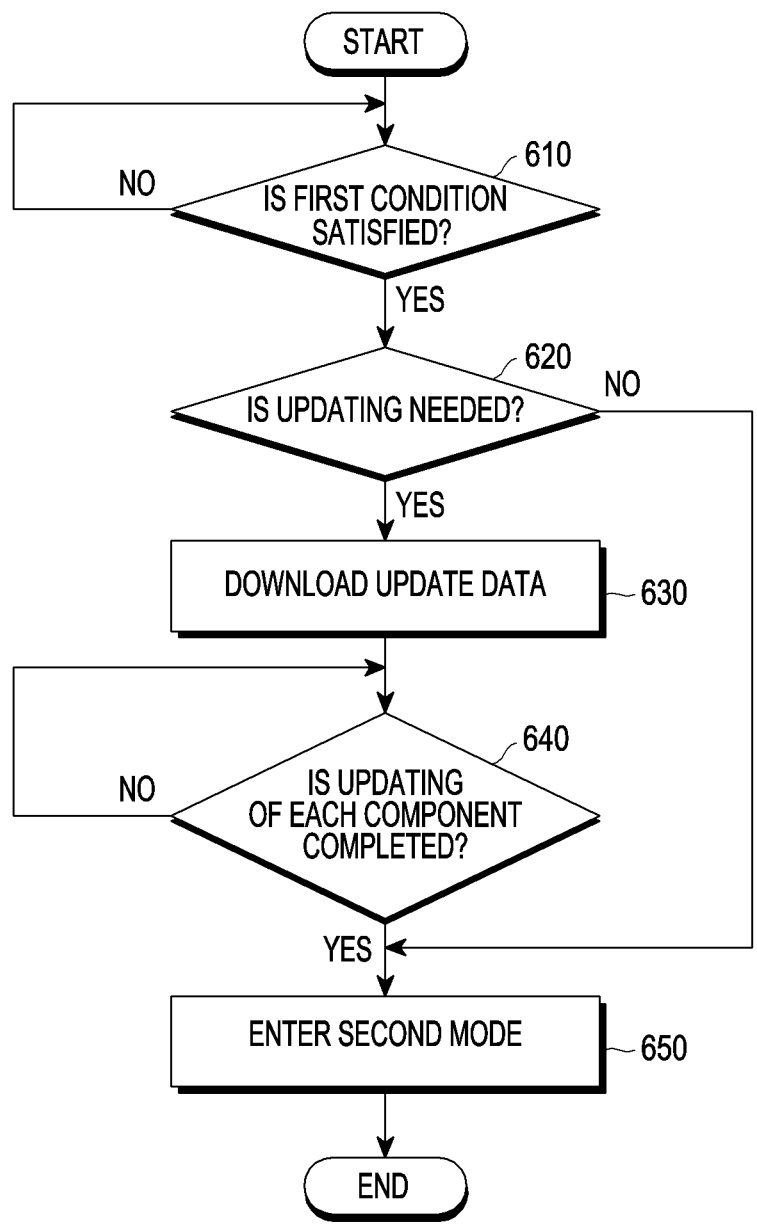
FIG. 6 is a flowchart illustrating an updating method of an electronic device according to various embodiments.

FIG. 6 is a flowchart illustrating an updating method of an electronic device according to various embodiments. The updating method may include operations 610 to 650. Each step/operation of the updating method may be performed by at least one of the electronic device (e.g., the electronic device 101), at least one processor (e.g., the processor 120) of the electronic device, or a controller (e.g., a combination of the processor 120 and a power management module (e.g., the power management module 188)) of the electronic device. In one embodiment, at least one of operations 610 to 650 may be omitted, some operations may be performed in a different order, or a different operation may be added.

In operation 610, the electronic device may determine whether a preset first condition is satisfied.

The electronic device may perform operation 620 when the first condition is satisfied, and may perform operation 610 periodically (or according to the occurrence of an event) when the first condition is not satisfied.

In one embodiment, the first condition may include at least one of detection of context for the electronic device, selection of a graphical element (or item) (e.g., a button, an icon, a menu, or a menu item) requiring a power saving mode, reception of a command/signal requiring power saving mode, a user input/command, entrance of the electronic device to a lock mode, or execution of a preset function/application.

In operation 620, the electronic device may determine whether updating of a power saving program that performs a second mode is required.

The electronic device may perform operation 630 when updating of the power saving program is required, and may perform operation 650 when updating of the power saving program is not required.

In operation 630, the electronic device may download update data for the power saving program.

The electronic device may download the power saving program from an external electronic device (e.g., the electronic device 102 or 104, the server 106, or the like).

In operation 640, the electronic device may sequentially update components of the power saving program and may determine whether each component is completely updated.

The electronic device may perform operation 650 when each component is completely updated, and may perform operation 640 when each component is not completely updated.

In one embodiment, the electronic device may sequentially update a launcher component, a provider component, and a service component of the power saving program.

The launcher component may control the second mode (or power saving function) overall, may generate a second graphical user interface, and may display the generated second graphical user interface on a display.

The provider component may allow the launcher component to access a necessary list/table/database to obtain necessary information.

The service component is a component implemented to run in the background and may not provide a separate user interface.

In operation 650, the electronic device may enter the second mode.

In the second mode, the electronic device may provide the second graphical user interface on the display.

FIG. 7A to FIG. 7H illustrate an operating method of an electronic device according to various embodiments. Each step/operation of the operating method may be performed by at least one of the electronic device 701 (e.g., the electronic device 101), at least one processor (e.g., the processor 120) of the electronic device 701, or a controller (e.g., a combination of the processor 120 and a power management module (e.g., the power management module 188)) of the electronic device 701.

Figure 7A:
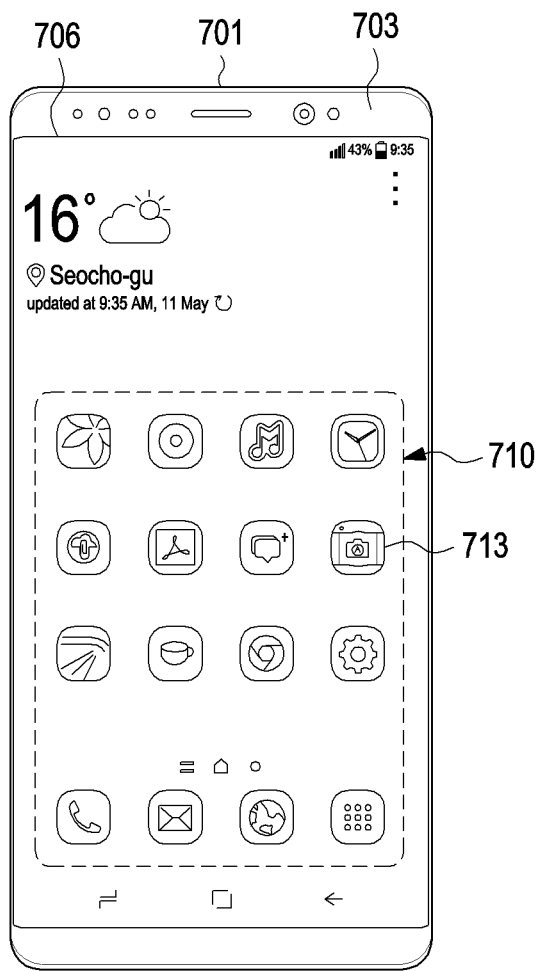
FIG. 7A to FIG. 7H illustrate an operating method of an electronic device according to various embodiments.

Referring to FIG. 7A, the electronic device 701 (e.g., the electronic device 101) may include a housing 703 and a display 706 (e.g., the display device 160). The display 706 may be at least partially disposed in the housing 703 and may be exposed through a portion of the housing 703.

The electronic device 701 may provide a first graphical user interface 710 on the display 706.

The first graphical user interface 710 may include a plurality of executable graphical elements 713 (e.g., a window, an item, a button, an icon, a menu, and a menu item) corresponding to a plurality of applications.

In one embodiment, when a user selects (e.g., touches) one of the plurality of graphical elements 713, an application corresponding to the selected graphical element may be executed, and a screen of the executed application may be displayed on a full screen.

Figure 7B:
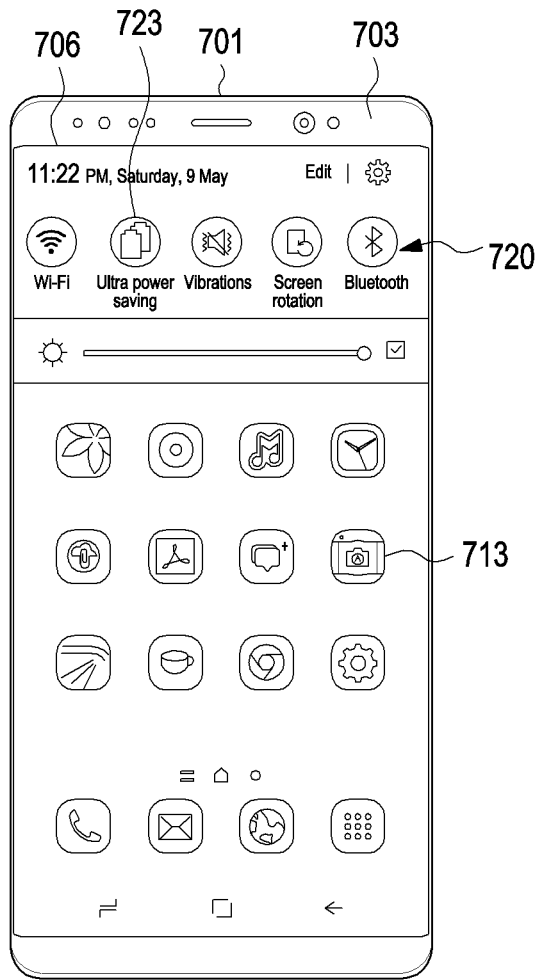

Referring to FIG. 7B, the electronic device 701 may display a top bar 720, based on an input on the display 706. The top bar 720 may include an item 723 for selecting a second mode (e.g., an ultra power saving mode).

The electronic device 701 may enter the second mode in response to the selection (e.g., touch) of the item 723. In the second mode, at least one function of the electronic device may be limited or blocked.

Figure 7C:
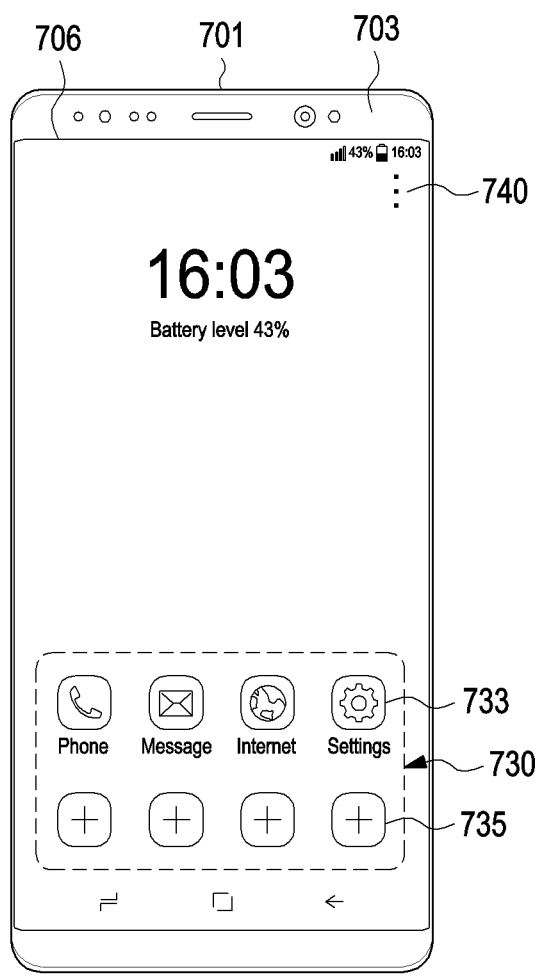

Referring to FIG. 7C, in the second mode, the electronic device 701 may display a second graphical user interface 730 on the display 706.

The second graphical user interface 730 may include a plurality of executable graphical elements 733 (e.g., a window, an item, a button, an icon, a menu, and a menu item) corresponding to a plurality of applications allowed to be used in the second mode among a plurality of applications installed or executable in the electronic device 701.

The second graphical user interface 730 may include an item 735 for adding a different executable graphical element to the second graphical user interface 730.

In one embodiment, the electronic device 701 may display a list of applications that can be included in the second graphical user interface 730 on the display 706 in response to the selection (e.g., touch) of the item 735 for adding the different executable graphical element.

The electronic device 701 may display an item 740 for displaying a menu related to the second mode on the display 706.

Figure 7D:
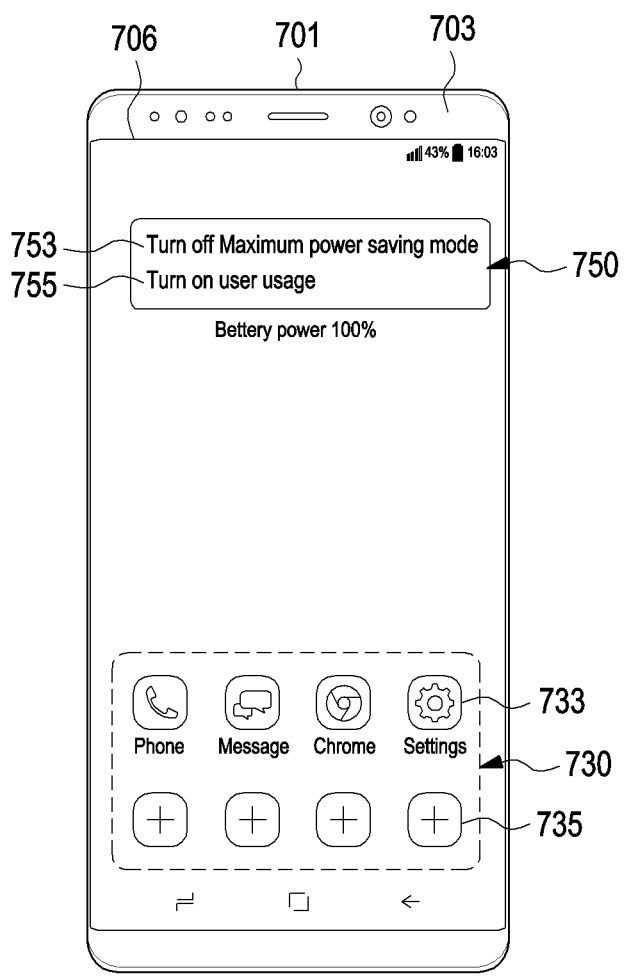

Referring to FIG. 7D, the electronic device 701 may display a menu 750 related to the second mode in response to the selection (e.g., touch) of the item 740 for displaying the menu related to the second mode. The menu 750 related to the second mode may include a first menu item 753 for switching from the second mode to a first mode and an item 755 for adding a different executable graphical element to the second graphical user interface 730 based on usage history information.

The electronic device 701 may switch from the second mode to the first mode in response to the selection (e.g., touch) of the first menu item 753 for switching. The electronic device 701 may release limitation/blocking of functions/applications that have been limited or blocked and may display the first graphical user interface 710, for example, as shown in FIG. 7A.

Figure 7E:
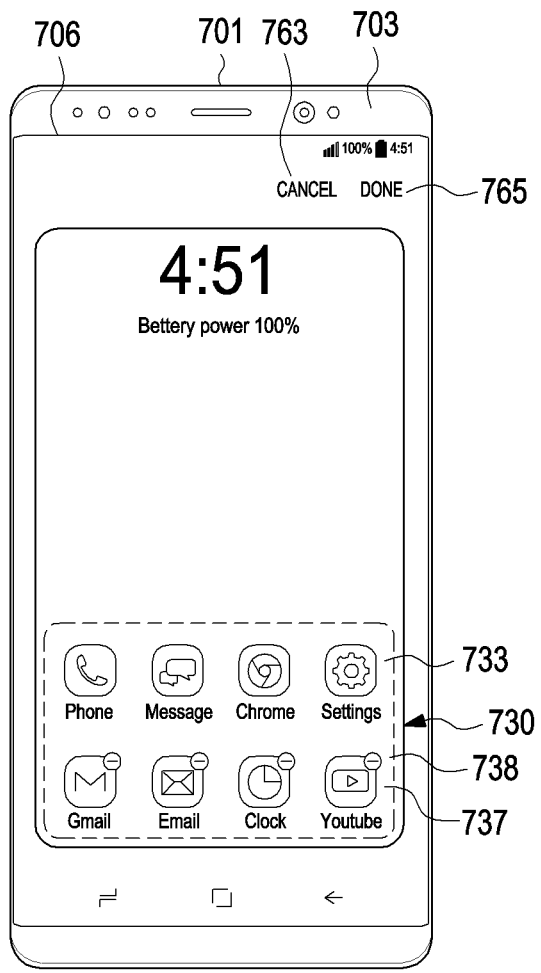

Referring to FIG. 7E, the electronic device 701 may add at least one graphical element 737 to the second graphical user interface 730 in response to the selection of the item 755 for adding the different executable graphical element to the second graphical user interface 730 based on the usage history information (or a list/table/database related to the usage history information).

In one embodiment, the electronic device 701 may add, to the second graphical user interface 730, at least one graphical element 737 corresponding to at least one application of which the number, time, or frequency of executions is ranked high or is equal to or greater than a threshold value among the plurality of applications.

In one embodiment, the electronic device 701 may add, to the second graphical user interface 730, at least one graphical element 737 corresponding to at least one application associated with a current place or time among the plurality of applications. For example, the electronic device 701 may add, to the second graphical user interface 730, a graphical element of an application previously used for the current place and/or time.

In one embodiment, the electronic device 701 may change the state of the added at least one graphical element 737 to an editable state and may display an identifier 738 indicating the editable state. For example, the user may touch the graphical element 737 indicated by the identifier 738 to be deleted or may drag the graphical element 737 indicated by the identifier 738 to a different position.

In one embodiment, when determining a different executable graphical element based on the usage history information, the electronic device 701 may downgrade the priority of an application of which addition is previously canceled or which is previously deleted.

The electronic device 701 may display a menu 760 related to the added at least one graphical element 737 on the display 706. The menu 760 may include a menu item 765 for releasing the editable state of the second graphical user interface 730 and a menu item 763 for canceling addition of the at least one graphical element 737.

For example, the electronic device 701 may cancel the addition of the at least one graphical element 737 in response to the selection (e.g., touch) of the menu item 763 for canceling the addition of the at least one graphical element 737 and may display the second graphical user interface 730, for example, as shown in FIG. 7C.

Figure 7F:
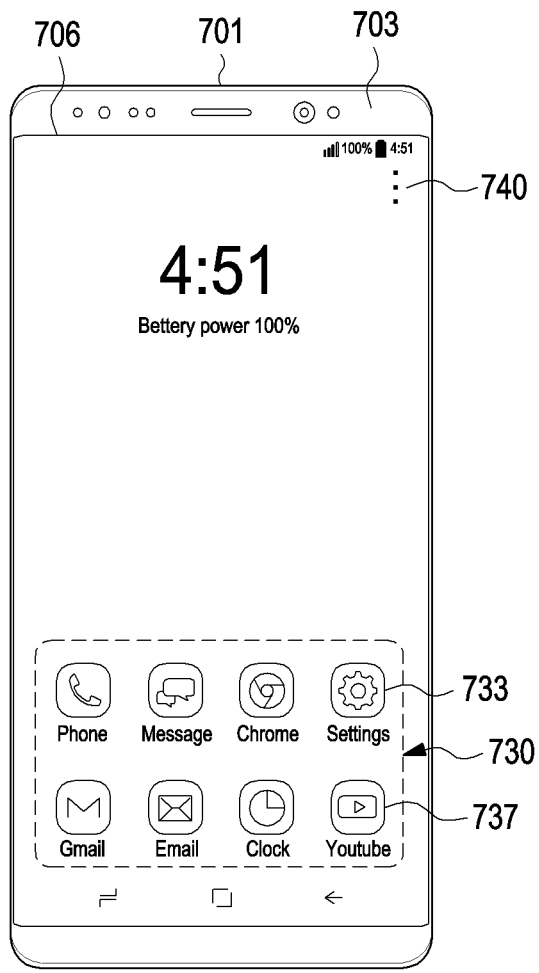

Referring to FIG. 7F, the electronic device 701 may release the editable state of the second graphical user interface 730 (or the at least one graphical element 737) in response to the selection (e.g., touch) of the menu item 765 for releasing the editable state.

Figure 7G:
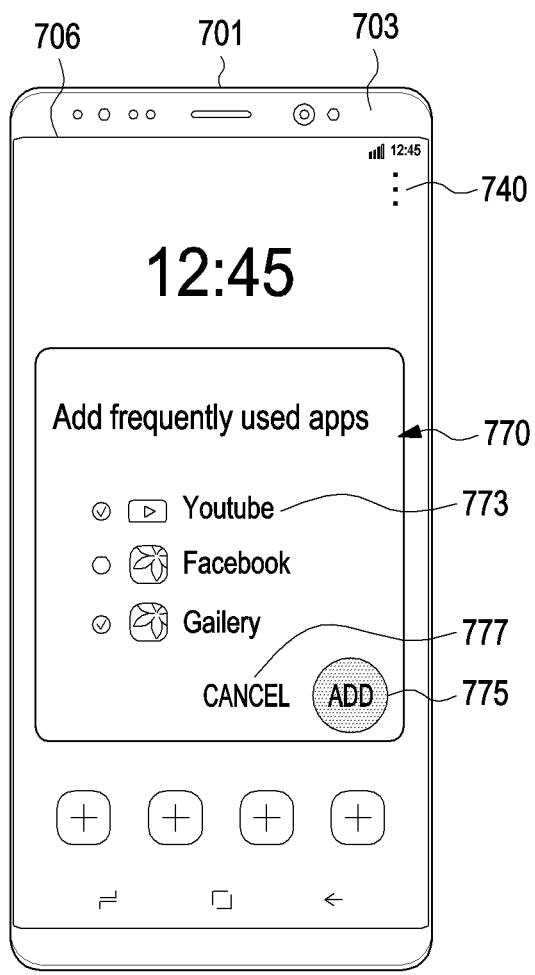

Referring to FIG. 7G, the electronic device 701 may display a window 770 for selecting the at least one graphical element 737 in response to the selection of the item 755 for adding the different executable graphical element to the second graphical user interface 730 based on the usage history information (or the list/table/database related to the usage history information) illustrated in FIG. 7D. The window 770 for selecting the at least one graphical element 737 may include at least one graphical element 773 corresponding to at least one application recommended based on the usage history information. For example, the user may select (e.g., touch) at least one of the recommended at least one graphical element 773. The window 770 may include a menu item 775 for adding the at least one graphical element 773 selected by the user to the second graphical user interface 730 and a menu item 777 for canceling addition of the at least one graphical element 773.

Figure 7H:
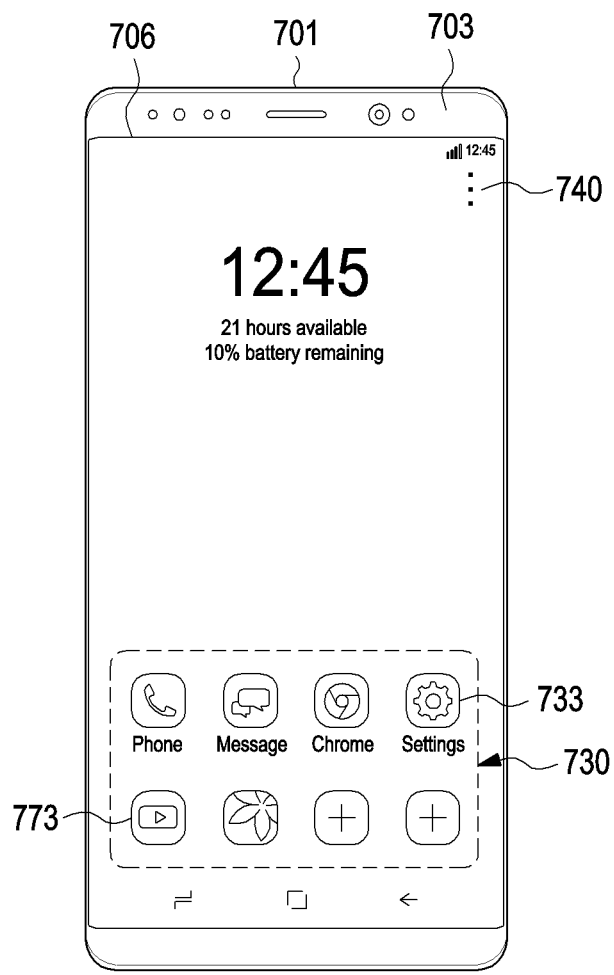

Referring to FIG. 7H, the electronic device 701 may add the at least one graphical element 773 selected by the user to the second graphical user interface 730 in response to the selection (e.g., touch) of the menu item 775.

FIG. 8A to FIG. 8D illustrate an operating method of an electronic device according to various embodiments. Each step/operation of the operating method may be performed by at least one of the electronic device 801 (e.g., the electronic device 101), at least one processor (e.g., the processor 120) of the electronic device 801, or a controller (e.g., a combination of the processor 120 and a power management module (e.g., the power management module 188)) of the electronic device 801.

Figure 8A:
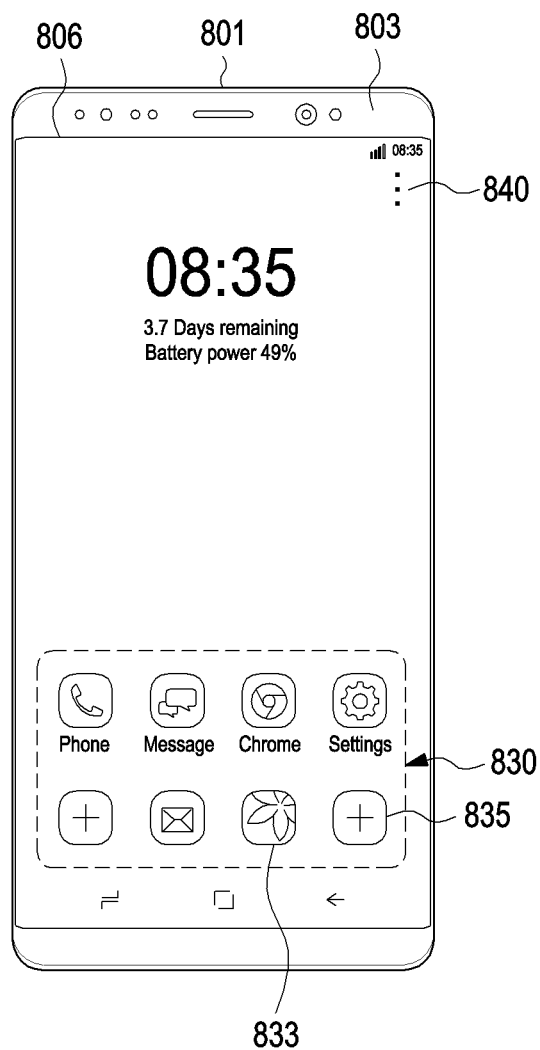
FIG. 8A to FIG. 8D illustrate an operating method of an electronic device according to various embodiments.

Referring to FIG. 8A, the electronic device 801 (e.g., the electronic device 101) may include a housing 803 and a display 806 (e.g., the display device 160). The display 806 may be at least partially disposed in the housing 803 and may be exposed through a portion of the housing 803.

In a second mode, the electronic device 801 may display a second graphical user interface 830 on the display 806.

The second graphical user interface 830 may include a plurality of executable graphical elements 833 (e.g., a window, an item, a button, an icon, a menu, and a menu item) corresponding to a plurality of applications allowed to be used in the second mode among a plurality of applications installed or executable in the electronic device 801.

The second graphical user interface 830 may include an item 835 for adding a different executable graphical element to the second graphical user interface 830.

The electronic device 801 may display an item 840 for displaying a menu related to the second mode on the display 806.

Figure 8B:
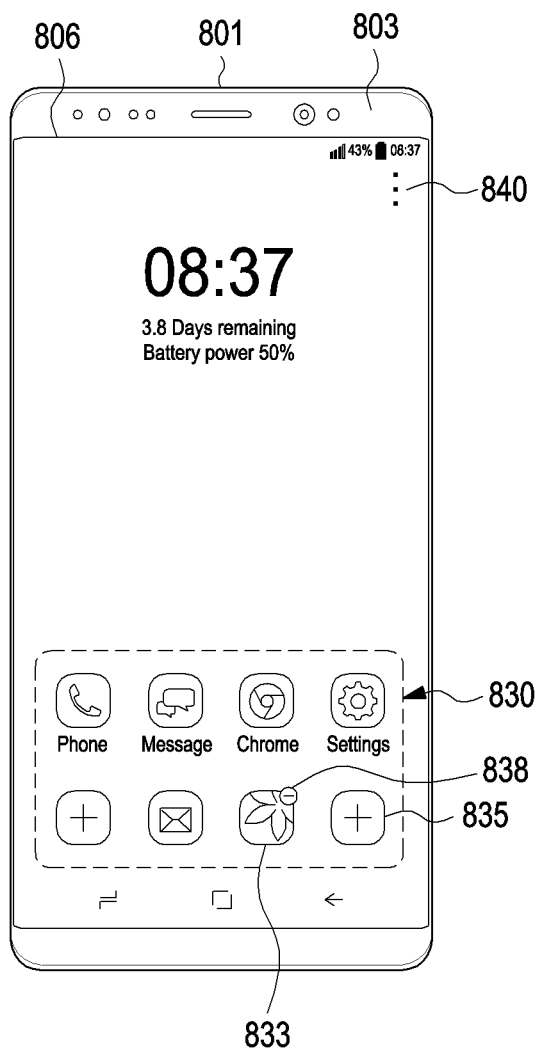

Referring to FIG. 8B, in response to the selection (e.g., long press) of an executable graphical element 833, the electronic device 701 may change the state of the selected graphical element 833 to an editable state and may display an identifier 838 indicating the editable state. For example, the user may touch the graphical element 833 indicated by the identifier 838 to be deleted or may drag the graphical element 833 indicated by the identifier 838 to a different position.

Figure 8C:
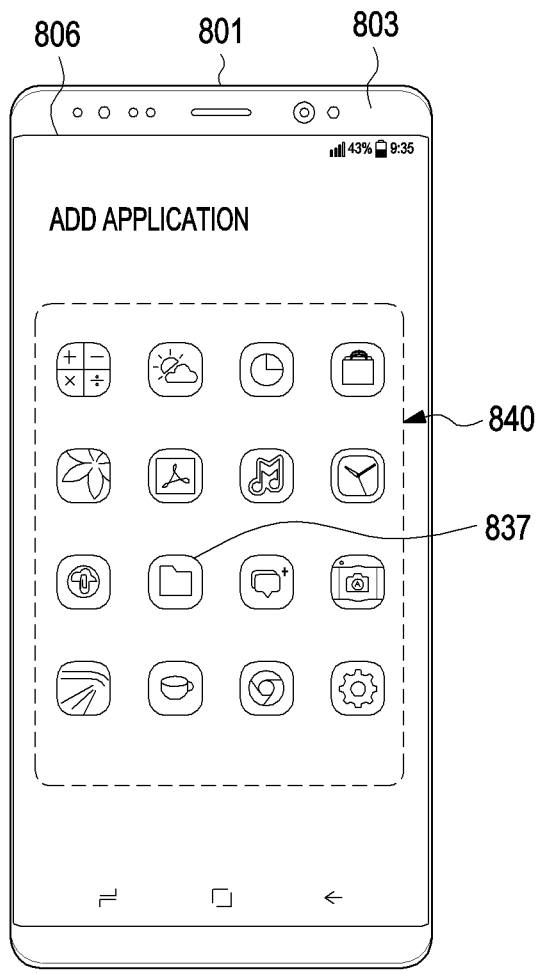

Referring to FIG. 8C, the electronic device 801 may display a list 840 of graphical elements corresponding to applications that can be included in the second graphical user interface 830 on the display 806 in response to the selection (e.g., long press) of the executable graphical element 833.

Figure 8D:
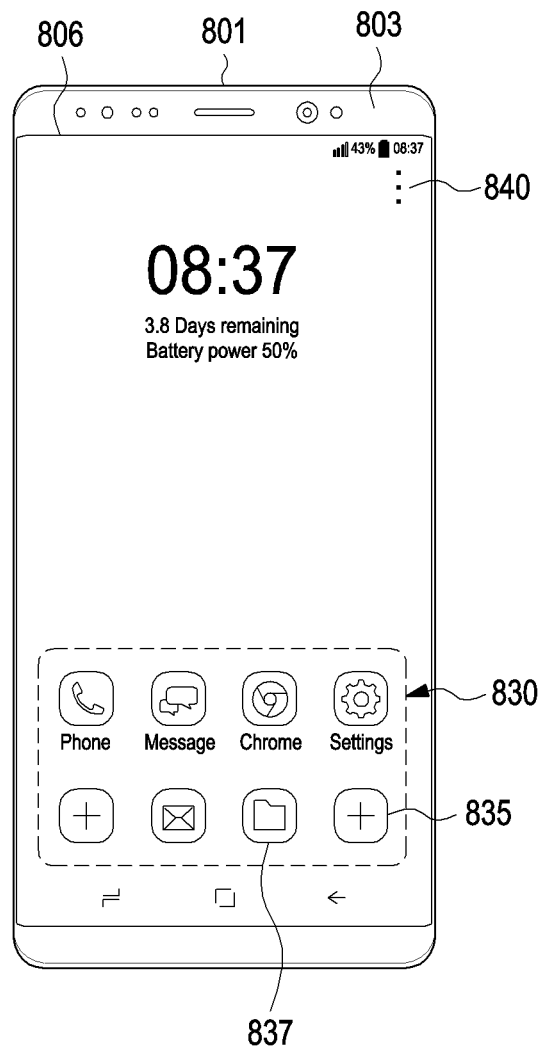

Referring to FIG. 8D, the electronic device 701 may replace the graphical element 833 in the editable state with at least one graphical element 837 selected by the user in response to the selection (e.g., touch) of any one graphical element 837 on the list 840 illustrated in FIG. 8C.

According to various embodiments, a non-transitory computer-readable recording medium may store instructions which are configured to, when executed by at least one circuit, cause the at least one circuit to perform at least one operation, wherein the at least one operation may include: providing a first graphical user interface including a plurality of graphical elements corresponding to a plurality of applications in a first mode; providing a second graphical user interface including graphical elements allowed to be used in a second mode among the plurality of graphical elements when a first condition is satisfied; and adding at least one graphical element among the plurality of graphical elements to the second graphical user interface when a second condition is satisfied.

100: electronic device, 120: processor, 130: memory, 150: input device, 160: display device, 190: communication module

What is claimed is:

1. An electronic device comprising:
a housing;
a display mounted in or coupled to the housing;
a processor disposed in the housing and electrically connected to the display; and
a memory disposed in the housing and electrically connected to the processor,
wherein the memory stores instructions which, when executed, cause the processor to:
display, in a first mode, a first graphical user interface comprising icons corresponding to a plurality of applications including a first group of applications and a second group of applications;

identify whether a power saving program requires an update;

in response to identifying that the power saving program requires the update, download update data and perform the update;

display, in a power saving mode, a second graphical user interface comprising icons corresponding to the first group of applications, wherein the first group of applications are allowed to be used in the power saving mode;

detect a first long press on a first icon corresponding to one of the first group of applications while displaying the second graphical user interface;

in response to detecting the first long press on the first icon, additionally display an identifier indicating that the first icon is editable;

detect a second long press on the first icon while displaying the identifier;

in response to detecting the second long press on the first icon, display icons corresponding to a plurality of candidate applications that are allowed to be used in the power saving mode;

detect an input on a second icon corresponding to one of the plurality of candidate applications; and display the second graphical user interface, wherein the first icon is replaced with the second icon, wherein the instructions cause the processor to:

display, together with the second graphical user interface, an item for adding a third icon to the second graphical user interface based on usage history information, wherein the usage history information includes a current place and a current time;

in response to detecting an input on the third icon, determine whether a first application corresponding to the third icon is a third-party application downloaded from an external electronic device;

in response to determining that the first application corresponding to the third icon is the third-party application, determine whether an identifier of the first application is included in a list stored in the memory; and in response to determining that the identifier of the first application is included in the list, add the third icon to the second graphical user interface.

2. The electronic device of claim 1, wherein at least one function of the electronic device is limited or blocked in the power saving mode.

3. An operating method of an electronic device, the method comprising:

displaying, in a first mode, a first graphical user interface comprising a plurality of graphical elements corresponding to a plurality of applications including a first group of applications and a second group of applications;

identifying whether a power saving program requires an update;

in response to identifying that the power saving program requires the update, downloading update data and performing the update;

displaying, in a power saving mode, a second graphical user interface comprising icons corresponding to the first group of applications, wherein the first group of applications are allowed to be used in the power saving mode;

detecting a first long press on a first icon corresponding to one of the first group of applications while displaying the second graphical user interface;

in response to detecting the first long press on the first icon, additionally displaying an identifier indicating that the first icon is editable;

detecting a second long press on the first icon while displaying the identifier;

in response to detecting the second long press on the first icon, displaying icons corresponding to a plurality of candidate applications that are allowed to be used in the power saving mode;

detecting an input on a second icon corresponding to one of the plurality of candidate applications; and displaying the second graphical user interface, wherein the first icon is replaced with the second icon, wherein the method further comprises:

displaying together with the second graphical user interface, an item for adding a third icon to the second graphical user interface based on usage history information, wherein the usage history information includes a current place and a current time;

in response to detecting an input on the third icon, determining whether a first application corresponding to the third icon is a third-party application downloaded from an external electronic device;

in response to determining that the first application corresponding to the third icon is the third-party application, determining whether an identifier of the first application is included in a list stored in a memory of the electronic device; and in response to determining that the identifier of the first application is included in the list, adding the third icon to the second graphical user interface.

4. A non-transitory computer-readable recording medium storing instructions which are configured to, when executed by at least one circuit of an electronic device, cause the at least one circuit to perform at least one operation, the at least one operation comprising:

displaying, in a first mode, a first graphical user interface comprising a plurality of graphical elements corresponding to a plurality of applications including a first group of applications and a second group of applications;

identifying whether a power saving program requires an update;

in response to identifying that the power saving program requires the update, downloading update data and performing the update;

displaying, in a power saving mode, a second graphical user interface comprising icons corresponding to the first group of applications, wherein the first group of applications are allowed to be used in the power saving mode;

detecting a first long press on a first icon corresponding to one of the first group of applications while displaying the second graphical user interface;

in response to detecting the first long press on the first icon, additionally displaying an identifier indicating that the first icon is editable;

detecting a second long press on the first icon while displaying the identifier;

in response to detecting the second long press on the first icon, displaying icons corresponding to a plurality of candidate applications that are allowed to be used in the power saving mode;

detecting an input on a second icon corresponding to one of the plurality of candidate applications; and displaying the second graphical user interface, wherein the first icon is replaced with the second icon, wherein the at least one operation further comprises:

displaying, together with the second graphical user interface, an item for adding a third icon to the second graphical user interface based on usage history information, wherein the usage history information includes a current place and a current time;

in response to detecting an input on the third icon, determining whether a first application corresponding to the third icon is a third-party application downloaded from an external electronic device;

in response to determining that the first application corresponding to the third icon is the third-party application, determining whether an identifier of the first application is included in a list stored in a memory of the electronic device; and in response to determining that the identifier of the first application is included in the list, adding the third icon to the second graphical user interface.

\* \* \* \* \*